April 6, 1965  J. R. HAYDEN  3,176,938
LANDING GEAR HEAT EXCHANGER ARRANGEMENT
Filed Sept. 5, 1963
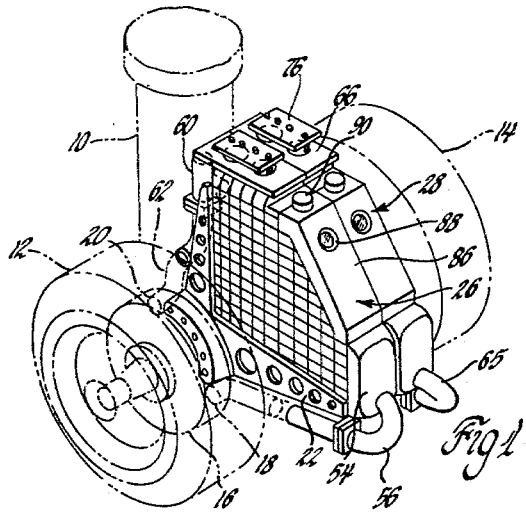
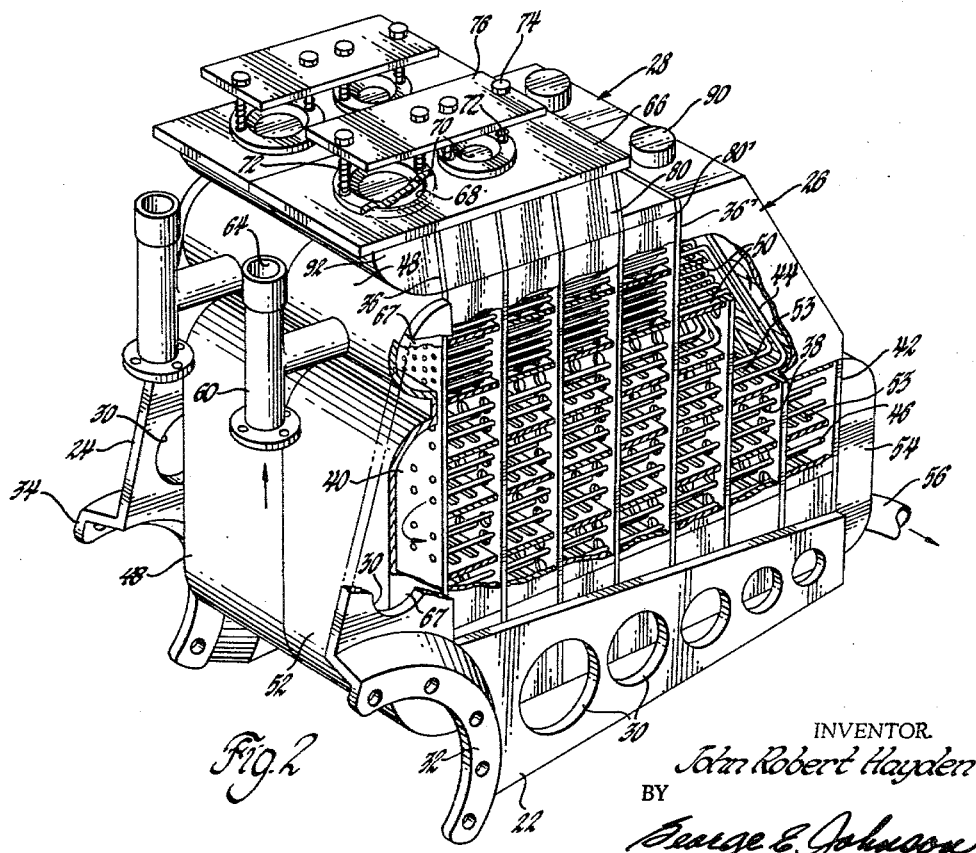
INVENTOR.
John Robert Hayden
BY
George E. Johnson
ATTORNEY United States Patent Office 3,176,938
Patented Apr. 6, 1965

3,176,938
LANDING GEAR HEAT EXCHANGER
ARRANGEMENT
John Robert Hayden, Lockport, N.Y., assignor to General Motors Corporation, Detroit, Mich., a corporation of Delaware
Filed Sept. 5, 1963, Ser. No. 306,920
3 Claims. (Cl. 244—111)

This invention relates to heat exchangers and more particularly to heat exchangers on airplane landing gear for extracting heat from liquid employed in reducing the temperature of brakes.

It is a common procedure to employ liquid cooled brakes for vehicles including trucks and airplanes but heretofore the cooling provisions were rotatably mounted, located directly on or within the wheels, or were placed remote from the wheel mounting and any one of these circumstances limited their cooling capacity. These circumstances are particularly objectionable in the field of heavier-than-air-aircraft.

The concept of using a peripheral type pump in connection with a vehicle brake on or in a wheel and a heat exchanger fixed to the vehicle frame for cooling the pumped brake fluid is old as shown in the United States Patents No. 3,061,048, granted October 30, 1962, and No. 2,934,177, granted April 26, 1960. In these patented constructions there is no problem presented in the placement of the heat exchanger.

An object of the present invention is to provide an arrangement of a heat exchanger for cooling an airplane brake, which exchanger is not unduly limited in its cooling capacity and is effective and reliable despite the rugged use and jolts to which landing gear and the associated wheels and brakes are subjected.

To this end, a feature of the present invention is an arrangement of at least one heat exchanger nonrotatively mounted on and with relation to a landing gear and connected to a supply of cooling liquid placed in heat transfer relation with an airplane wheel brake.

These and other important features of the invention will now be described in detail in the specification and then pointed out more particularly in the appended claims.

In the drawings:

FIGURE 1 is a perspective view of the wheeled portion of an airplane landing gear with dual heat exchangers mounted thereon thereby presenting one embodiment of the present invention; and FIGURE 2 is a enlarged perspective view of the dual heat exchangers shown in FIGURE 1 with portions broken away to illustrate the interior construction.

The lower end of an airplane landing gear strut, together with landing wheels and one brake pump is diagrammatically depicted in dot and dash lines at 10 in FIGURE 1. The wheels are indicated at 12 and 14 and each wheel incorporates a pump structure such as shown at 16 within the wheel 12. Details regarding the landing gear and pump structure are not given herein as they form no part of the present invention. It will be appreciated, however, that the pump 16 would, as in the case of most pumps, incorporate a rotor and a stator portion and that the stator portion would have a fixed pump inlet and outlet such as diagrammatically represented at 18 and 20 respectively.

It has been found that if the brakes on an airplane were cooled by a liquid that the heat absorption capacity of such liquid has heretofore been much limited by virtue of the nature of a landing gear. It is obvious that an airplane landing gear should not be unduly heavy and that all of its components should by characterized by great ruggedness enabling it to withstand the terrific jolts received in usage. With the present invention, it is possible to supply adequate cooling of an airplane brake for a period of time more than sufficient for cooling of the brake and without diminishing the ruggedness of the landing gear as a whole.

In FIGURES 1 and 2, it will be seen that two V-shaped flanges such as indicated at 22 and 24 are mounted between the landing wheels 12 and 14 in such a way as to support dual back-to-back heat exchangers 26 and 28. The two arms of each flange 22 and 24 bear lightening holes 30 and an arcuate flange is used such as at 32 or 34 for attachment to the stator part of the corresponding wheel and brake assembly. The V-shaped flanges 22 and 24 are welded to opposite sides of the heat exchanger arrangement and each exchanger 26 or 28 comprises vertical partition plates 36 bearing multiple perforations 38. These plates as well as two tube sheets 40 and 42 for each exchanger are arranged in parallel relation and made to accommodate the open ends of heat exchange tubes. These heat exchange tubes are in two banks for each exchanger. One bank of tubes 44 is U-shaped and forms two horizontal passes and another bank of tubes 46 forms one horizontal pass. The tubes 44 are made U-shaped so that they will pass fluid from a half cylinder header 48 along the upper side of one of a multiplicity of horizontal baffle plates 50 and back under a lower plate 50 to a chamber in a lower header 52. The plates 50 bear slots 53. The lower tubes 46 are arranged to transfer the flow from the header 52 to the other end of the heat exchanger and into a header 54. The flow is then continued by a conduit 56 to the inlet 18 of the brake pump of the adjacent wheel. The half cylindrical header 48 is connected by means of a T-fitting 60 to a conduit 62 which in turn is connected to the outlet 20 of the same brake pump. The top of the fitting 60 bears an opening 64 for receiving a filler plug or cap (not shown).

It will be appreciated that the exchanger 28 will have equivalent and separate connections to the brake pump of the wheel 14. The return connection to the brake pump of the wheel 14 is shown at 65 in FIGURE 1. Other details of the exchanger 28 are duplicates of those shown with respect to the exchanger 26.

The top of the heat exchanger 26 is fitted with a horizontal plate or casing wall 66 which bears two vents or apertures as at 68 to form vents from the zone around the tubes 44 and 46. Each of the apertures 68 is covered with a valve plate 70 and the latter is held down on the plate 66 to close its particular vent 68 by means of multiple springs 72 and these springs are held in position by means of bolts 74 slidably received in the valve plates and a deflector plate 76 held by the bolts 74 in position above the valve plates 70. Each valve plate 70 is dished in the interest of lightweight construction.

Most of the description thus far given has related to the single heat exchanger 26 but it must be appreciated that the heat exchangers are similar in construction and are mounted side by side conveniently to serve adjacent wheels. Each housing of each heat exchanger comprises side plates such as the plates 80 and 80' and these plates are welded to the vertical plates 36 and 36'. The plates 80 extend down one side of a given heat exchanger across the bottom of that heat exchanger and up the other side with both ends of each plate welded to the plate 66. The plate 80' does not have its ends abut the plate 66 but extends at a lower level and across the heat exchanger to form a surface flush with the top edge of the plate 36' which is of less height than that of the plates 36. A vertical arm of the flange 22 is flat against a wall 67 and the latter closes off one end of each of the headers 48 and 52. The tube sheet 42 extends along and above the header 54 and forms a partially inclined top wall 86 of the exchanger casing. This inclined wall portion carries a sight glass 88 and a horizontal part of this wall is provided with a filler opening and a cap 90 and is flush with the top edge of the plate 36'. Above the header 48 is a segmental header 92 serving slightly to increase the steam or vapor capacity of the exchanger 26.

It should be particularly noted that the tubes are grouped more closely together in the top interior zone of each heat exchanger and that the lower half or portion of the latter is larger than the top portion. Because of these features the possibility of liquid being blown out without being vaporized is considerably reduced.

With the construction shown, the exchangers 26 and 28 may operate independently but it is obvious that the housing and headers may be so made that no wall or walls separate the inner compartments of one exchanger from those of the other enabling all tubes to serve both brake systems.

In operation, each exchanger is partially filled with water or an equivalent vaporizable liquid of sufficient heat capacity to serve the purpose. A suitable level would be a level immediately below the top of the header 52. The brake system for each wheel is a closed system filled with a suitable involatizable fluid as in the patents above mentioned and when a given brake such as the brake used with the pump 16 is applied, the heat developed by that brake will be absorbed by the involatizable fluid and forced by the wheel actuated pump 16 through the conduit 62 and into the half cylindrical header 48 from which the fluid will pass through the tubes of the two banks 44 and 46 and be returned by way of the conduit 56 to the inlet of the pump 16. The heat absorbed by the involatizable brake fluid will be transmitted to the water present in the space surrounding the tubes within the heat exchanger, and when sufficient heat is absorbed to cause the water to vaporize, the pressure will build up in the heat exchanger and the steam or vapor generated will be vented as the pressure opens the vents 68. After each landing the water level within each heat exchanger may be checked by use of the sight glass 88 and the supply of water may be replenished by removing the cap 90. The brake fluid may be supplied or replenished if lost by leakage by way of the capped opening 64.

With the above described construction, a considerable heat capacity to absorb the heat developed by the braking is available and the heat exchanger is not of such weak or heavy construction that it must be mounted on the frame of the airplane. The rugged construction permits close associated with the brake system and improved airplane braking is the ultimate result.

I claim:

1. A heat exchanger adapted to be mounted on the nonrotative part of a brake pump of an airplane landing gear and free of the wheel axle of the latter, said exchanger comprising a housing with headers connected by tubes and means for introducing and withdrawing brake cooling fluid to said headers and tubes, perforated partition means lying in intersecting planes stiffening said housing and dividing the interior thereof into communicating zones as coolant spaces around said tubes, flange means on said housing for attaching the latter to said nonrotative part, and pressure actuated means on the top of said housing for venting said zones to the atmosphere.

2. The arrangement in combination with an airplane landing gear wheel and brake assembly having a stator part surrounding a supporting axle, said arrangement including a liquid to liquid heat exchanger, the latter comprising a housing enclosing perforated plates intersecting to partition and traverse a vaporizing zone for a first fluid, headers located at opposite sides of said heat exchanger, tubes forming multiple passes extending through said partitioned and vaporizing zone and connecting said headers, a pressure actuated vent on said housing and leading from said vaporizing zone, conduit means adapted to connect said headers to said stator part to accommodate circulatory flow of a non-vaporizable second fluid such as a brake coolant through said tubes, and flange means on said housing for attaching and supporting said heat exchanger on said stator part away from said axle.

3. The arrangement as set forth in claim 2, the said vaporizing zone having an upper portion of relatively small size and enlarged low portion, the said tube passes being grouped closely together near said pressure actuated vent in said upper portion of said vaporizing zone and spaced further apart in said enlarged low portion of said vaporizing zone, the said perforated plates and closely grouped tube passes being effective in restraining blow-off of said first fluid in liquid form while giving free egress to said first fluid in vapor form, and said flange means being arcuate to clear the axle of the said wheel and brake assembly.

References Cited by the Examiner
UNITED STATES PATENTS

| 2,012,662 | 8/35 | Frank | 188—264 |
| 3,042,155 | 7/62 | Kelly | 188—264 |
| 3,044,736 | 7/62 | Chambers | 244—111 |
| 3,061,048 | 10/62 | Alsobrooks et al. | 188—264 |

MILTON BUCHLER, *Primary Examiner.*

ANDREW H. FARRELL, *Examiner.*